United States Patent Office 3,380,467
Patented Apr. 30, 1968

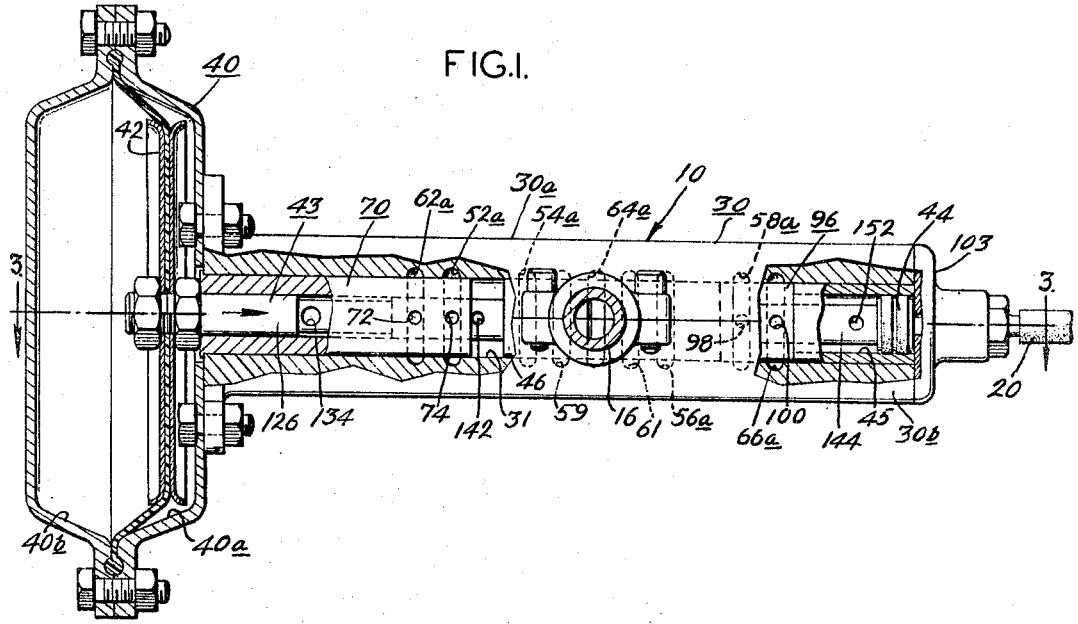
FIG.1.
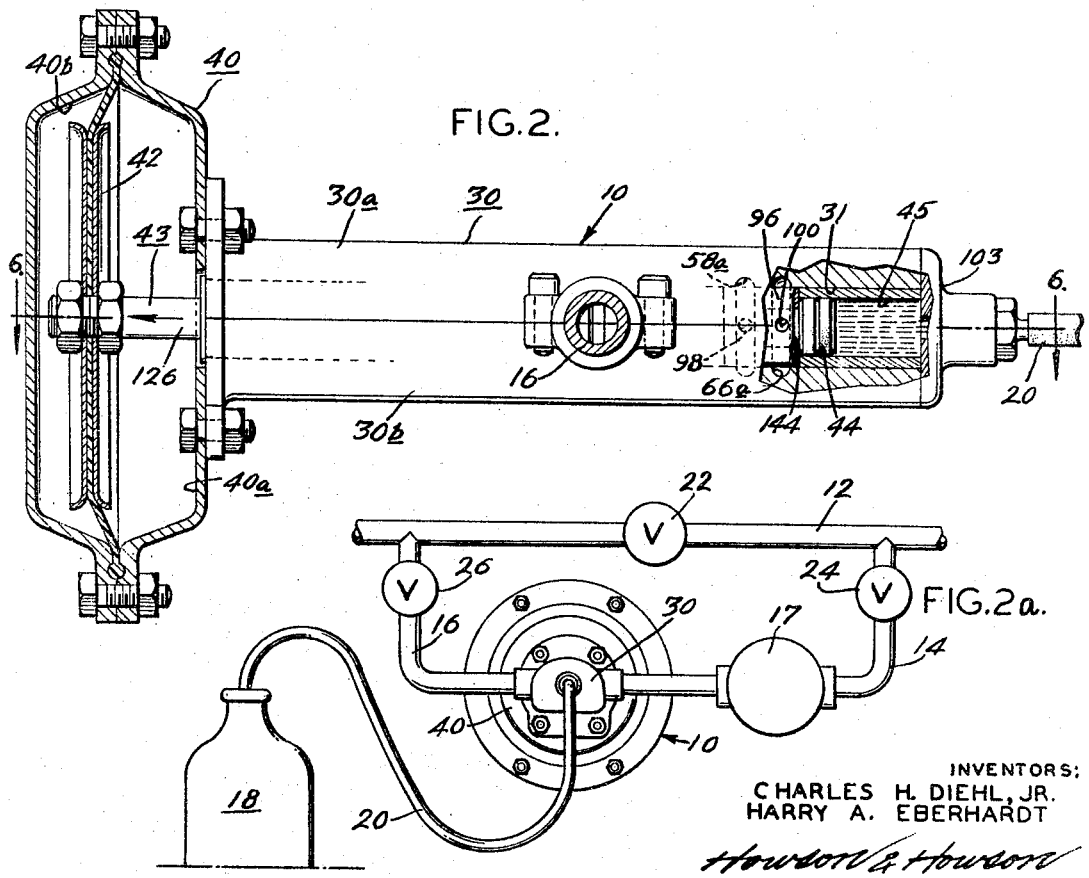
FIG.2.
FIG.2a.
INVENTORS:
CHARLES H. DIEHL, JR.
HARRY A. EBERHARDT
Howson & Howson
ATTYS.

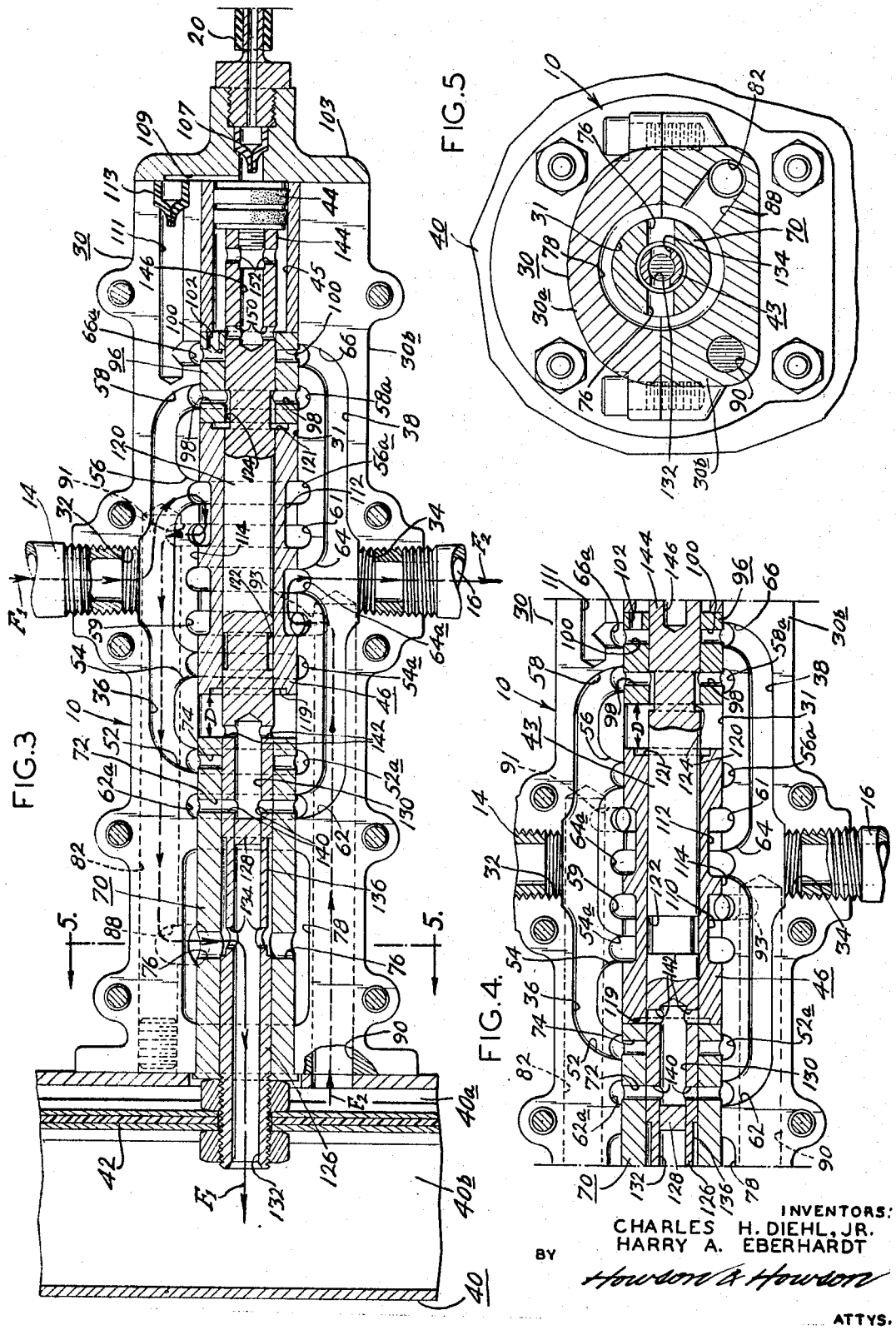

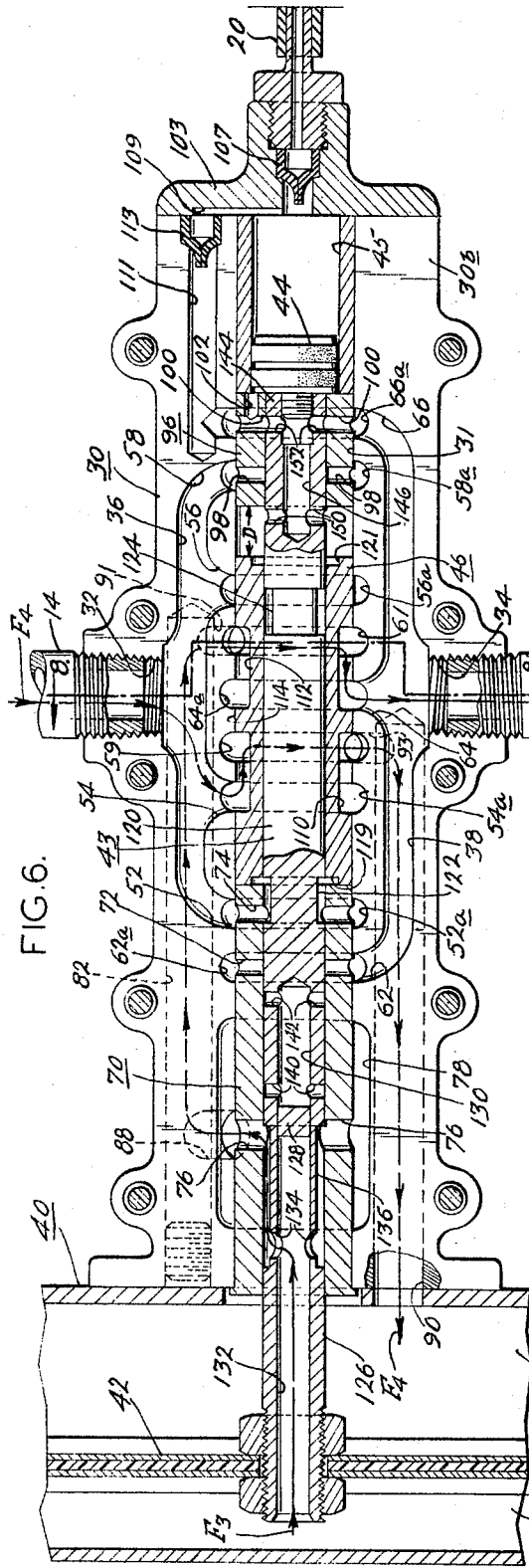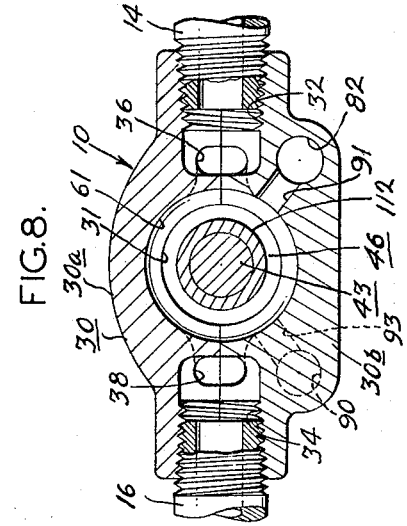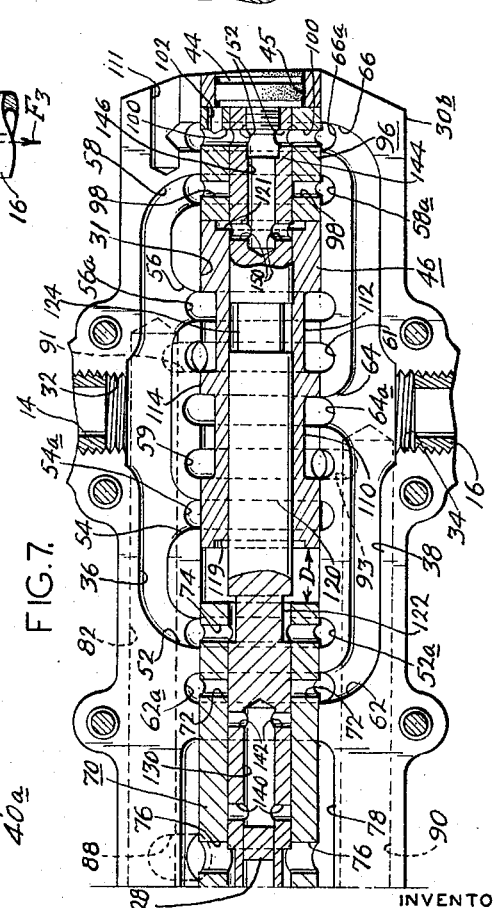

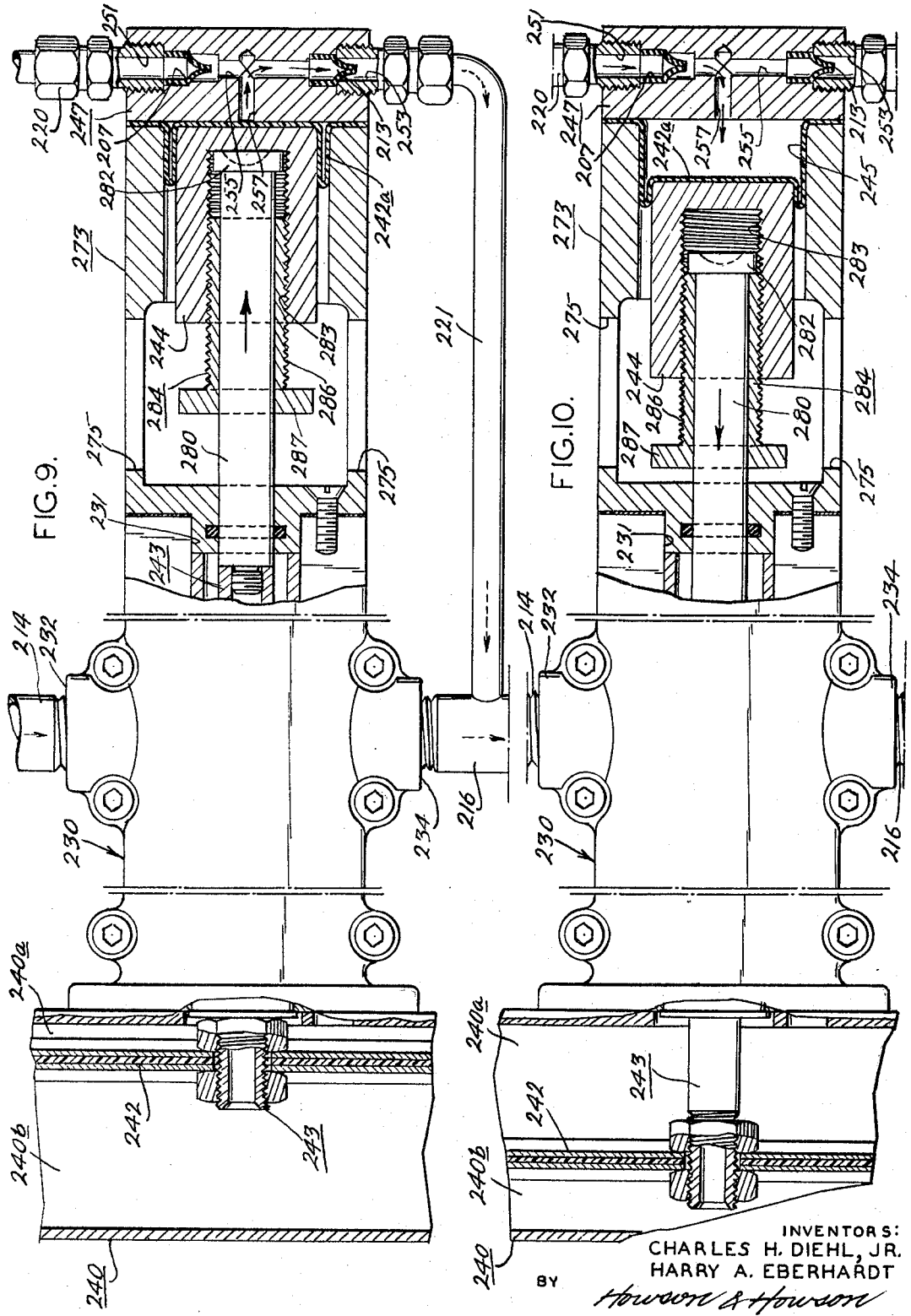

3,380,467
PROPORTIONING APPARATUS
Charles H. Diehl, Jr., Springfield, and Harry A. Eberhardt, King of Prussia, Pa., assignors to Hale Fire Pump Company, Conshohocken, Pa., a corporation of Pennsylvania
Filed Dec. 21, 1965, Ser. No. 515,318
9 Claims. (Cl. 137—99)

The present invention relates to fluid proportioning apparatus for mixing or blending different types of fluids in a predetermined ratio.

The proportioning apparatus of the present invention is particularly useful in the agricultural industry, for example, as a means for medicating the drinking water of livestock. The proportioning apparatus is usually mounted in the water feed line and serves to automatically and continuously mix predetermined quantities of a liquid additive such as a medication to the drinking water delivered to the troughs for consumption by the livestock. In these applications, it is highly desirable and essential that the proportioning apparatus is reliable and that the ratio of additive to primary fluid is uniform.

It has been found that the proportioning apparatus which are currently available on the market fail within a comparatively short period of continuous use and hence, are not reliable. Some of these prior proportioning apparatus have a substantial number of exposed moving parts which, for example, when the apparatus is used in the livestock industry, are exposed to dust, dirt and other foreign matter which retards movement of the parts and leads to failure of the apparatus. Of course, frequent breakdown of the apparatus requiring replacement is costly, especially where a continuous supply of the mixture is required such as in the livestock industry.

Further, frequent replacement requires storage of a supply of proportioning apparatus. Additionally, in most of these prior apparatus the moving parts are not axially aligned whereby frictional forces lead to wear of parts and premature failure of the apparatus. Moreover, these prior apparatus rely on spring mechanisms to actuate some of the moving parts thereof, which spring mechanisms are subject to overstressing and failure over a period of use.

In most of these prior apparatus, the additive and primary fluid are discharged into a mixing chamber and from there displaced by the flow of additional amounts of blended mixture in the chamber into the supply line, for example, leading to the troughs. Because of this arrangement, the mixture is not always uniform, there being the possibility of some of the additive settling out of the mixing chamber. Also in this type of system, the additive charges are added intermittently to the primary fluid. Additionally, in some of the prior proportioners, the proportion of additive to primary fluid is dependent on the source pressure of the primary fluid and if this pressure varies, the blend ratio varies. Accordingly, it is difficult in these apparatus to accurately control the consistency of the final mixture. In these apparatus it is necessary to partially disassemble parts of the apparatus to prime before each use, which disassembly can be time consuming and a nuisance.

With the foregoing in mind, an object of the present invention is to provide a proportioning apparatus which is extremely reliable in operation and operates for an extended period of time with minimal maintenance due to the fact that there are no external moving parts necessary to the operation of the apparatus which accumulate dust, dirt or foreign matter, the novel arrangement of the apparatus eliminating the need for spring actuators, seals, packing or lubrication which accordingly minimizes the possibility of leakage as a result of wear.

Another object of the present invention is to provide a proportioning apparatus having novel features of construction and arrangement whereby a continuous blending of a primary fluid and an additive in a predetermined uniform relationship is assured regardless of variations in the source pressure of the primary fluid.

Still another object of the present invention is to provide a proportioning apparatus which operates solely on the water pressure in the feed line eliminating the need for a separate power source and does not require disassembly of parts of the apparatus to prime for initiating operation thereof.

A further object of the present invention is to provide a proportioning apparatus wherein continuous operation to supply a uniform mixture is assured regardless of line pressure and the apparatus continues to supply primary fluid even if the additive supply is exhausted.

A still further object of the present invention is to provide a proportioning apparatus wherein the parts thereof are substantially axially aligned thereby minimizing wear due to side thrust loads.

An additional object of the present invention is to provide a proportioning apparatus whereby the additive is continuously mixed with primary fluid during operation of the apparatus.

These and other objects of the present invention and the various features and details of the operation and construction of a proportioning apparatus are hereinafter more fully set forth with reference to the accompanying drawing, wherein:

FIG. 1 is a side elevational view partly in section of a proportioning apparatus in accordance with the present invention showing the valve shaft in its inner limit position;

FIG. 2 is a view similar to FIG. 1 with the valve shaft in the opposite outer limit position;

FIG. 2a is a schematic illustration of a feed system incorporating proportioning apparatus in accordance with the present invention;

FIG. 3 is an enlarged sectional view taken on lines 3—3 of FIG. 1;

FIG. 4 is an enlarged fragmentary sectional view showing the parts of the apparatus in the same relative position as in FIG. 3 except that the flow control shuttle spool is moved to a limit position opposite to that shown in FIG. 3;

FIG. 5 is an enlarged transverse sectional view through the valve body taken on lines 5—5 of FIG. 3;

FIG. 6 is an enlarged longitudinal sectional view through the apparatus taken on lines 6—6 of FIG. 2;

FIG. 7 is an enlarged fragmentary sectional view showing the parts of the apparatus in the same relative position as FIG. 6 except that the flow control shuttle spool is moved to a limit position opposite to that shown in FIG. 6;

FIG. 8 is an enlarged sectional view taken on lines 8—8 of FIG. 6;

FIG. 9 is a side elevational view of another embodiment of proportioning apparatus in accordance with the present invention with parts broken away to show the details of the additive supply system and showing the valve shaft in its inner limit position; and FIG. 10 is a side elevational view partly in section similar to FIG. 9 showing the valve shaft in its outer limit position.

With reference to the drawings and particularly to FIG. 2a thereof, there is illustrated a typical installation incorporating a proportioning apparatus 10 in accordance with the present invention. The installation includes a supply line 12 adapted to be connected at one end to a source of a primary fluid, for example, water and at its opposite end to a source of use, for example, a watering trough for livestock.

An inlet branch conduit 14 connects the supply line 12 to the inlet or supply side of the proportioning apparatus 10 and an outlet branch conduit 16 connects the discharge side of the proportioning apparatus to the supply line 12 downstream of the inlet conduit connection. A filter 17 may be provided in the inlet branch conduit 14 to filter the primary liquid prior to entering the proportioning apparatus. An additive, for example, medication, is stored in a container 18 and is adapted to be fed to the proportioning apparatus through an additive supply line 20. Flow control valves are provided in the system for selectively controlling flow of the primary fluid in the system. Thus, there is provided a by-pass valve 22 in the primary fluid supply line 12 between the branch conduits 14 and 16 and control valves 24 and 26 are provided in the inlet and outlet branch conduits 14 and 16 respectively.

By this arrangement, when it is desired to mix or blend additive with the primary fluid, the by-pass valve 22 is closed and the branch conduit control valves 24 and 26 are opened. Thus, the primary fluid is directed from the source through the inlet branch conduit 14 into the proportioning apparatus 10. The line pressure of the primary fluid actuates the proportioning apparatus to draw predetermined quantities of the additive and blend the same with predetermined controlled amount of the primary fluid, the accurately proportioned mixture being discharged through the outlet branch conduit 16 to be carried through the supply line to the source of use, for example, the watering troughs for livestock.

Considering now the structural arrangement of the proportioning apparatus 10 and particularly the principal components thereof, the proportioning apparatus 10 comprises an elongated main valve housing 30 having a longitudinally extending central bore 31, inlet and discharge means including in the present instance diametrically opposed inlet and discharge ports 32 and 34, respectively to which the inlet and discharge branch conduits 14 and 16 are connected and inlet and discharge manifolds 36 and 38 in the housing communicating respectively with the inlet and outlet ports 32 and 34. In the present instance, the main valve housing 30 consists of an upper section 30a and a lower section 30b for ease of construction and assembly of the apparatus.

A diaphragm housing 40 is mounted at one end of the main valve housing which supports therein a movable member in the present instance a flexible diaphragm 42 extending generally transversely of the valve housing 30 and dividing the inside of the diaphragm housing 40 into an inner chamber 40a and an outer chamber 40b. A valve shaft assembly 43 is mounted in the central bore 31 of the main housing 30, being connected at one terminal end to the diaphragm 42 and at its opposite terminal end supporting a piston 44 adapted for movement in an additive chamber 45 in fluid communication with additive supply source 18 through line 20. A control shuttle spool 46 circumscribes valve shaft 43 at approximately the midpoint thereof and is adapted for reciprocating motion axially relative to the valve shaft 43 between one limit position designated a first right hand limit position (see FIG. 3) and an opposite limit position, designated a second left hand limit position (see FIG. 6).

Various ports, passages and channels are provided in the parts of the apparatus to facilitate continuous operation of the apparatus to mix or blend quantities of the primary fluid and the additive in a predetermined substantially uniform ratio.

For example, considering now briefly the broad components of the proportioning apparatus in terms of function, primary fluid such as water under pressure entering inlet port 32 flows into the inlet manifold 36 where the shuttle spool 46 is in its first limit position, and the primary fluid is directed through various ports and channels through the valve shaft 43 into the outer diaphragm chamber 40b. As the outer diaphragm chamber 40b is filled, the diaphragm 42 is displaced axially to the right and the valve shaft 43 is moved toward its inner limit position (see FIG. 3). During movement of the valve shaft 43 to its inner limit position, primary fluid in the inner diaphragm chamber 40a is displaced through ports and channels to the discharge manifold 38, the position of the shuttle spool 46 permitting flow in the manner outlined above. Also, during this stroke of the valve shaft 43, additive fluid in the additive chamber 45 is pumped by the piston 44 to the discharge manifold where it is mixed with the primary fluid. As the valve shaft 43 approaches its inner limit position, a by-pass chamber in the valve shaft 43 is brought into registry with the inlet manifold whereby water pressure pushes the shuttle spool 46 to its second limit position (see FIG. 4).

In this position of the shuttle spool 46, flow of primary fluid from the inlet manifold to the diaphragm chambers is reversed; that is, water from the inlet manifold now is directed into the inner chamber 40a whereby the axial movement of the valve shaft 43 is reversed and the fluid in the outer diaphragm chamber 40b is vented to the discharge manifold. As the valve shaft 43 is moved in the manner discussed above, a predetermined quantity of additive is drawn into the additive supply chamber 45 by the piston and on the reverse stroke of the valve shaft, the predetermined quantity of additive is discharged into the discharge manifold 38 and mixed therein with the predetermined quantity of the primary liquid. By this arrangement, during continued operation of the apparatus which simply relies on the pressure of the primary fluid, predetermined quantities of additive are continuously mixed and blended with a predetermined controlled quantity of the primary fluid.

Considering now in more detail the specific arrangement of the proportioning apparatus, and with particular reference to FIGS. 3 and 6, the inlet manifold 36 has, in the present instance, four axially spaced legs 52, 54, 56 and 58 which communicate with four axially spaced annular grooves defining inlet passages 52a, 54a, 56a and 58a in the central bore 31 of the valve housing 30. The discharge manifold 38 has, in the present instance three axially spaced legs 62, 64, and 66 which communicate with three axially spaced annular grooves defining outlet passages 62a, 64a and 66a in the central bore 31 of the valve housing.

As illustrated, the passages in direct communication with the inlet manifold 36 are staggered or offset relative to the passages in direct communication or alignment with the discharge manifold 38, the outer outlet passages 64a and 66a being outboard of the outermost inlet passages 52a and 58a and the central annular outlet passage 64a being disposed between the innermost annular inlet passages 54a and 56a. A pair of annular grooves defining transfer passages 59 and 61 is provided in the central bore 31 of the valve housing on either side of the central outlet passage 64a and inboard of the inner pair of inlet passages 54a and 56a. It is noted that in the inlet passages 54a and 56a, the outlet passage 64a and transfer passages 59 and 61 are axially spaced apart a uniform distance, the purpose of which will be apparent later.

An elongated tubular sleeve 70 is mounted in the central bore 31 of the valve housing adjacent the diaphragm housing 40. The sleeve 70 has a pair of diametrically opposed radial outlet ports 72 communicating with the outlet passage 62a and a pair of diametrically opposed radial inlet ports 74 communicating with the inlet passage 52a. The sleeve 70 is also provided with an enlarged pair of diametrically opposed radial openings 76 communicating with an enlarged section of the bore 31 which defines an annular transfer reservoir 78 surrounding the sleeve 70.

This annular reservoir 78 in turn communicates with the transfer passage 61 through an elongated axially extending bore 82 in the valve housing 30, the bore 82 connected adjacent to opposite ends by short bridging ports 88 and 91 to the reservoir 78 and transfer passage 61 respectively. A second elongated axially extending bore 90 is provided in the valve housing which bore 90 communicates at one end with the inner diaphragm chamber 40a and at its opposite end with the transfer passage 59 through bridging port 93.

A short tubular sleeve 96 is mounted in the bore of the valve housing adjacent the additive chamber 45, the sleeve 96 having a pair of diametrically opposed radial inlet ports 98 communicating with the annular inlet passage 58a and a pair of diametrically opposed radial outlet ports 100 communicating with the outlet passage 66a. The radial outlet port 100 also communicates with the interior of the additive chamber 45 through a short connecting branch port 102. The confronting axial end faces of the sleeves 70 and 96 are spaced apart an axial distance greater than the length of the shuttle spool 46 to permit movement of the shuttle spool between limit positions.

The shuttle spool 46 is an elongated tubular member having in the present instance a pair of annular undercuts in its outer periphery defining side by side flow control channels 110 and 112 which are separated by a circumferentially extending dividing land 114.

Each of these channels is of a predetermined axial length to span or bridge a pair of the adjacent annular passages in the group between the inlet passages 54a and 56a when the shuttle spool is disposed at either opposite limit position thereby to control the flow path of primary fluid through the apparatus. More particularly the channels are located relative to the axial ends of the shuttle spool so that when the shuttle spool is at its first limit position (FIG. 3), the flow control channel 110 bridges the passages 59 and 64a permitting flow of primary fluid from the inner diaphragm chamber 40a to the discharge manifold and the flow control channel 112 bridges the passages 61 and 56a permitting flow of primary fluid from the inlet manifold to the outer diaphragm chamber 40b. In the second limit position of the shuttle spool, the flow control channel 110 bridges passages 54a and 59 and the flow control channel 112 bridges passages 64a and 61 permitting reverse flow, that is, flow of primary fluid into the inner diaphragm chamber 40a and discharge from the outer chamber 40b. In the present instance the spacing between the sleeves is chosen so that the gap D between the shuttle spool and the end face of a sleeve is approximately equal to the spacing between the center line of adjacent passages of the group between inlet passages 54a and 56a so that the flow control channels 110 and 112 bridge the selected passages at either opposite limit position as described above.

The shuttle spool 46 has annular recesses 119 and 121 in opposite axial end faces thereof which, when the by-pass chamber on the spindle are aligned with the inlet manifold, facilitate movement of the shuttle spool by water pressure.

As best illustrated in FIG. 3, the additive supply system includes the supply line 20 which is connected at one end to the suitable source of supply and at its opposite end to a cap 103 mounted on the outer end of the valve housing, the cap having a central bore communicating with the additive chamber. Mounted in cap 103 is an outlet check valve 107 of the duck bill type which permits flow into the additive chamber and restricts flow outwardly therefrom. The inner face of the cap 103 has a radial cutout 109 communicating with a passageway 111 in the valve housing which also mounts a discharge check valve 113 therein of the duck bill type. This passageway 111 communicates with the radial port 100 in the valve sleeve 96 to permit flow of additive to the discharge manifold.

Considering now the structural details of the valve shaft assembly, the valve shaft 43 comprises a central section 120 having in its outer periphery adjacent opposite ends thereof undercuts or recesses defining a pair of by-pass chambers 122 and 124 to facilitate flow of the primary fluid therethrough to actuate the shuttle spool 46 when the valve shaft 43 is disposed at opposite limit positions and the channels 122 and 124 register with the inlet passages 52a and 58a, respectively.

The forward section 126 at the diaphragm end of the valve shaft 43 is hollow as best illustrated in FIG. 3 and is divided by means of a plug 128 into an inner vent chamber 130 having diametrically opposed radial vent ports 140 and 142 at opposite axial ends and an outer flow channel 132. The outer flow channel 132 is open at its outer end to communicate with the outer diaphragm chamber 40b and has diametrically opposed radial openings 134. These radial openings 134 are disposed in the area of an annular undercut 136 on the outer periphery of the forward section 126, the undercut 136 providing a clearance between valve shaft 43 and sleeve 70 to permit flow from reservoir 78 into the flow channel 132 of the valve shaft and outer diaphragm chamber 40b during actuation of the valve shaft between limit positions. The rear section 144 at the additive end of the valve shaft assembly includes the piston 44 and a second vent chamber 146 between the piston and the central section having pairs of vent ports 150 and 152 at opposite axial ends.

Consider now the operation of the proportioning apparatus with specific attention to the operation and function of the internal parts thereof and assume that the parts of the apparatus are in the position shown in FIG. 3. Further assume that the outer diaphragm chamber 40b has just been filled during movement of the valve shaft 43 toward its inner limit position.

It is noted that during this movement, the shuttle spool 46 is in the first limit position as shown where the inlet passage 56a and transfer passage 61 are in communication through the flow control channel 112 and the outlet passage 64a and transfer passage 59 are in communication through the flow control channel 110. Thus, water from the inlet manifold 36 flows through the communicating inlet passage 56a and transfer passage 61 to bore 82, through reservoir 78 and flow channel 132 of valve shaft 43 to outer diaphragm chamber 40b (indicated by flow line $F_1$ in FIG. 3). Further water in the inner diaphragm chamber 40a is displaced by the diaphragm 42 and flows through the bore 90, branch port 93, the transfer passages 59 and outlet passage 64a to the discharge manifold 38 (indicated by flow line $F_2$ in FIG. 3). Additionally, additive in the additive chamber 45 is displaced by the piston 44 through check valve 113, passageway 111 and outlet passage 66a to the discharge manifold 38. Some additive, approximately less than one-half of the additive displaced by the piston 44, flows from the passageway 111 into the additive chamber 45 behind piston 44 through the port 102. Now as the valve shaft reaches its extreme inner limit position, the annular by-pass chamber 124 registers with the inlet port 98 in sleeve 96 so that the primary fluid pressure now acts on the annular recess 121 in one axial end face of the spool 46 and moves it left to the position shown in FIG. 4. It is noted that the water in the space between the sleeve 70 and the other axial end face of the spool 46 vents through discharge passage 62a to the discharge manifold 38 through the vent ports in the vent chamber 130. Now when the shuttle spool 46 is in the extreme second limit position abutting the axial end face of the forward sleeve 70 as shown in FIG. 6, the flow control channel 110 bridges the inlet passage 54a and transfer passage 59 and the annular flow control channel 112 bridges the outlet passage 64a and the transfer passage 61 (see FIG. 6). In this position of the shuttle spool 46, water from the inlet manifold 36 flows through inlet passage 54a, transfer passage 59 to bore 90 and into the inner diaphragm chamber 40a thereby moving the valve shaft 43 left to the position shown in FIG. 6 (as indicated by flow line $F_3$ in FIG. 6). During this stroke of the valve shaft 43, water in the outer diaphragm chamber 40b flows through the flow channel 132, radial opening 134, annular reservoir 78, bridging port 88, bore 82, bridging port 91 and into the transfer passage 61. This transfer passage 61 is now in fluid communication with the central outlet passage 64a so that the water discharges into the discharge manifold 38 (indicated by flow line $F_4$ in FIG. 6). During movement of the valve shaft to the left in the manner described above, the piston 44 draws a predetermined quantity of the additive through the inlet check valve 107 into the additive chamber 45.

As the piston 44 is moving into the additive chamber 45, additive in the additive chamber 45 behind the piston is displaced through port 102 into the discharge manifold whereby additive is being continually mixed and blended with primary fluid in the discharge manifold during operation of the apparatus. Now when the valve shaft has reached its extreme outer limit position as shown in FIG. 6, the by-pass chamber 122 of the valve shaft registers with the inlet port 74 to admit water under pressure from the inlet manifold 36 which acts against the annular recess 119 in the opposite axial end of the shuttle spool to again move it to the first limit position (see FIG. 7). The water in the space between the opposite axial end face of the shuttle spool and the short sleeve 96 is vented through vent ports 150, vent chamber 146 in the piston end of the valve shaft, through outlet ports 100 in sleeve 96 to the discharge manifold 38 to permit displacement of the shuttle spool to the right. Now with the shuttle spool in the original position discussed above, flow of water in the apparatus is reversed so that the valve shaft is moved to the right. During movement of the valve shaft to the right, the additive drawn into the additive chamber 45 is displaced through passageway 111 and outlet port 100 in sleeve 96 to discharge passage 66a and discharge manifold 38 so that the predetermined quantity of additive displaced is mixed and blended with the predetermined quantity of primary fluid flowing in the discharge manifold.

The shuttle spool and valve shaft continuously cycle in the manner described above to blend or mix predetermined quantities of the primary fluid, for example, water with predetermined quantities of the additive, for example, a medication. It is noted that the ratio of medication to water may be varied, for example by changing the size of the diaphragm chambers, changing the displacement stroke of the piston, or enlarging the additive chamber.

There is shown in FIGS. 9 and 10 another embodiment of proportioning apparatus in accordance with the present invention. Various components of this embodiment of proportioning apparatus are identical in construction and arrangement to that described above. Thus, the proportioning apparatus includes an elongated main valve housing 230 having a longitudinally extending central bore 231, inlet and discharge means including opposed inlet and discharge ports 232 and 234 to which the inlet and discharge branch conduits 214 and 216 are adapted to be connected. The proportioning apparatus further includes a diaphragm housing 240 at one end of the main valve housing which supports therein a movable member in the form of a diaphragm 242 dividing the housing into an inner chamber 240a and an outer chamber 240b. The apparatus further includes a valve shaft 243 connected at one end to the diaphragm 242 and a shuttle spool circumscribing the valve shaft.

The operation of the proportioning apparatus with regard to the flow of primary fluid is the same as that described above. Thus, as described above in detail, the flow path of primary fluid into and out of the diaphragm chambers is controlled by the shuttle spool and the resultant flow of the primary fluid in the system effects reciprocating movement of the valve shaft between opposite limit positions. However, in accordance with this embodiment an additive supply system is provided whereby the ratio of additive to primary fluid may be selectively varied in a simple and effective manner. To this end as best illustrated in FIG. 9, the additive supply system includes an elongated generally cylindrical casing 273 secured at one end to the main valve housing 230 by suitable fastening means, a piston member 244 mounted interiorly of the casing 273 and adapted for reciprocating axial movement therein and an outer cap member 247 mounted over the outer open end of the casing 273.

A diaphragm 242a which is made of a flexible resilient material and which may be termed a "top hat" diaphragm is secured at its outer peripheral edge between the outer axial end face of the casing 273 and the cap 247 by a suitable fastening means. The diaphragm 242a is also secured at its central portion to the outer or front face of the piston 244. By this arrangement there is defined an additive chamber 245 between the outer face of the diaphragm and the inner face of the cap 247.

The cap 247 has in the present instance diametrically opposed additive inlet and discharge ports 251 and 253, the additive inlet port adapted to be connected to a source of additive through an additive supply line 220 connected to the additive inlet port 251 and the additive discharge port 253 being connected to the outlet branch conduit 216 through an additive discharge line 221. The additive inlet and discharge ports are connected by a passageway 255 in the cap 247, a branch passageway 257 providing a connecting line between the passageway 255 and the additive chamber 245. An inlet check valve 207 of the duck bill type is mounted at one end of the passageway adjacent the additive inlet port 251 to permit flow from the source into the diaphragm chamber 245 and a discharge check valve 213 of the duck bill type is provided at the opposite end of the passageway 255 adjacent the additive discharge port 253 to permit flow from the additive chamber to the discharge line 221.

The piston is adapted for reciprocating movement in the casing 273 during axial movement of the valve shaft between opposite limit positions to draw a predetermined quantity of additive to the additive chamber during movement of the valve shaft 243 in one axial direction and to discharge the predetermined quantity of additive from the additive chamber during movement of the valve shaft 243 in the opposite direction. To this end, the outer terminal end of the valve shaft 243 mounts an elongated extension 280 which has at its outer free terminal end a radially outwardly projecting flange 282 of a dimension to slidably engage in the cylindrical bore 283 in the piston 244.

An adjustable stop member 284 circumscribes the extension 280 and has an externally threaded shank portion 286 which screws into the threaded bore 283 of the piston so that the position of the stop member 284 relative to the piston 244 may be selectively varied. The side wall of the casing 273 is provided with window openings 275 to permit manual adjustment of the stop member 284 by turning the head 287 thereof.

This arrangement provides a means for selectively varying the volume of the additive chamber and hence a means for selectively regulating the ratio of additive to primary fluid. In the operation of the apparatus, assume that the valve shaft is in its inner limit position as shown in FIG. 9. During movement of the valve shaft to its inner limit position, the outer free terminal end of the extension 280 abuts the bottom of the bore in the piston 244 and moves the piston 244 to displace a predetermined quantity of additive in the additive chamber through the branch passageway 257, passageway 255, discharge check valve 213, additive discharge line and into the outlet branch conduit 216 where it is mixed with the primary fluid. During axial movement of the valve shaft in the opposite direction, the extension 280 moves relative to the piston 244 until the flange 282 abuts the axial end face of the stop member 284 and then the piston 244 moves with the shaft member to draw a predetermined quantity of additive into the additive chamber.

It is noted that the lost motion movement between the extension 280 and the piston 244 may be varied by adjusting the stop member 284 and by this adjustment the volume of the additive chamber and thus the quantity of additive drawn into the chamber may also be selectively varied.

From the foregoing, it is apparent that the proportioning apparatus of the present invention is characterized by novel features of construction and arrangement providing efficient and effective proportional mixing or blending of fluid in a continuous operation. The proportioning apparatus of the present invention is highly reliable in operation since there are no external moving parts which can accumulate dirt or foreign matter, and hence, the operation is trouble free. Further, operation of the apparatus is continuous and simply depends on flow of primary fluid. As noted previously, the proportioning apparatus of the present invention does not require disassembly of parts for purposes of priming. The various moving parts of the apparatus such as the valve shaft assembly and shuttle spool are coaxially mounted thereby minimizing radial force and thereby insuring continuous trouble-free operation over an extended period of use because of reduced wear on parts. Moreover in applicants' apparatus the need for spring actuators, seals, packing or lubrication is obviated.

While a particular embodiment of the present invention has been illustrated and described herein, it is not intended to limit the invention to such disclosure, but changes and modifications may be made therein and thereto within the scope of the following claims.

We claim:

1. Proportioning apparatus for mixing a primary fluid and an additive fluid comprising a main valve housing having a main bore, inlet and discharge means communicating with said main housing, an additive chamber, a housing mounted at one end of said main housing having a member dividing the housing into a pair of chambers, a valve shaft adapted for reciprocating movement in said main bore and being connected at one end to said member and a shuttle spool in the main housing adapted for axial movement relative to said valve shaft between a first limit position establishing fluid communication between said inlet means and one of said chambers and fluid communication between said other chamber and said outlet means whereby flow of primary fluid from said inlet means effects axial movement of said valve shaft in one direction, and a second limit position establishing fluid communication between said inlet means and said other chamber and fluid communication between said one chamber and said discharge means whereby flow of primary fluid from said inlet means effects axial movement of said valve shaft in a direction opposite said one direction, back and forth axial movement of said valve shaft operable to draw predetermined quantities of additive into said additive chamber and discharge the same to said discharge means.

2. A proportioning apparatus as claimed in claim 1 wherein said inlet means includes an inlet manifold in said main housing and said discharge means includes a discharge manifold in said main housing and including a plurality of axially spaced annular grooves in the main bore of said main housing, some of said annular grooves defining inlet passages communicating with said inlet manifold, others of said annular grooves defining discharge passages communicating with said discharge manifold, still others of said annular grooves defining transfer passages, said shuttle spool having a pair of side by side flow control channels spanning selected ones of said inlet, discharge and transfer passages when said shuttle spool is in said first and second limit positions.

3. A proportioning apparatus as claimed in claim 1 including means whereby said shuttle spool is actuated between opposite limit positions when said valve shaft approaches opposite limit positions.

4. A proportioning apparatus as claimed in claim 2 wherein said valve shaft includes a pair of axially spaced annular recesses in its outer periphery defining by-pass chambers, said by-pass chambers in fluid communication with said inlet manifold when said valve shaft is disposed in its opposite limit positions whereby primary fluid pressure effects actuation of said shuttle spool from one of its limit positions to the other of its limit positions.

5. A proportioning apparatus as claimed in claim 2 including a first axial bore in said main housing communicating at one end with one of said transfer passages and at its opposite end with one of said chambers.

6. A proportioning apparatus as claimed in claim 5 including a second axially extending bore in said main housing communicating at one end with another of said transfer passages and at its opposite end with the other chamber.

7. A proportioning apparatus as claimed in claim 6 wherein said valve shaft comprises a central section, a forward hollow section secured to said dividing member and a rearward section mounting a piston and including means defining an annular transfer reservoir in the main housing communicating with said second axial bore and said hollow forward section of said valve shaft to permit flow from said inlet manifold to said other chamber through said valve shaft.

8. A proportioning apparatus as claimed in claim 1 including means for selectively varying the volume of the additive chamber.

9. A proportioning apparatus as claimed in claim 1 wherein said additive chamber is defined in part by a flexible diaphragm and including a piston connected to said diaphragm and adjustable lost motion means operably connecting the valve shaft to said piston.

References Cited
UNITED STATES PATENTS

| | | | |
|---|---|---|---|
| 2,787,223 | 4/1957 | Sargent | 103—46 |
| 2,929,253 | 3/1960 | Baldelli | 103—38 |
| 3,227,093 | 1/1966 | Taplin | 103—150 |

WILLIAM F. O'DEA, *Primary Examiner.*

H. COHN, *Assistant Examiner.*